[12] United States Patent
Gurram et al.

(10) Patent No.: US 9,471,445 B2
(45) Date of Patent: Oct. 18, 2016

(54) QUICK FAILOVER OF BLADE SERVER

(71) Applicant: International Business Machines Corporation, Armonk, NY (US)

(72) Inventors: Nagendra K. Gurram, Bangalore (IN); Ajay Y. Pandey, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 14/034,591

(22) Filed: Sep. 24, 2013

(65) Prior Publication Data
US 2015/0006951 A1 Jan. 1, 2015

Related U.S. Application Data

(63) Continuation of application No. 13/930,291, filed on Jun. 28, 2013, now Pat. No. 9,229,825.

(51) Int. Cl.
G06F 11/20 (2006.01)

(52) U.S. Cl.
CPC ....... *G06F 11/2007* (2013.01); *G06F 11/2025* (2013.01); *G06F 11/2028* (2013.01); *G06F 11/2041* (2013.01); *G06F 11/2046* (2013.01)

(58) Field of Classification Search
CPC ........... G06F 11/2038; G06F 11/2028; G06F 11/2025; G06F 11/2033; G06F 11/1451; G06F 11/1469; G06F 11/1658; G06F 11/2023; G06F 11/0712; G06F 11/1484
See application file for complete search history.

(56) References Cited

U.S. PATENT DOCUMENTS

| | | | | |
|---|---|---|---|---|
| 6,801,949 B1 * | 10/2004 | Bruck | ............... | H04L 29/12009 709/232 |
| 7,971,089 B2 | 6/2011 | Yoshikawa et al. | | |
| 8,028,193 B2 | 9/2011 | Dake et al. | | |
| 8,161,315 B2 | 4/2012 | Holdaway et al. | | |
| 8,250,166 B1 * | 8/2012 | Barnes | ................ | G06F 11/2023 709/213 |
| 8,275,907 B2 | 9/2012 | Thiel et al. | | |
| 2006/0020850 A1 * | 1/2006 | Jardine | ............... | G06F 11/1004 714/11 |
| 2009/0077370 A1 * | 3/2009 | Barabash | .............. | G06F 9/4405 713/100 |
| 2009/0158081 A1 | 6/2009 | Dake et al. | | |
| 2010/0325522 A1 | 12/2010 | Tsukamoto et al. | | |
| 2012/0084628 A1 | 4/2012 | Cox et al. | | |

(Continued)

FOREIGN PATENT DOCUMENTS

CN 102043688 A 5/2011

OTHER PUBLICATIONS

Batalha et al., "Integrated Virtualization Manager for IBM Power Systems Servers", <ibm.com/redbooks>, Third Edition (Dec. 2012), International Technical Support Organization, © Copyright International Business Machines Corporation 2012, This document was created or updated on Dec. 17, 2012.

(Continued)

*Primary Examiner* — Nadeem Iqbal
(74) *Attorney, Agent, or Firm* — Stephen R. Yoder; David B. Woycechowsky

(57) ABSTRACT

Failover process for switching from a "failing" blade server to a "replacing" blade server. This process includes the following steps: (i) booting a replacing blade server to a set of operating system(s) including a first operating system; and (ii) subsequent to the booting of the replacing blade server, sending command data to the replacing blade server. The command data includes a command for the replacing blade server to configure itself to replace the failing blade server.

2 Claims, 4 Drawing Sheets

(56) References Cited

U.S. PATENT DOCUMENTS

| | | |
|---|---|---|
| 2012/0096310 A1* | 4/2012 | Varanasi ............ G06F 11/1032 714/15 |
| 2012/0203875 A1 | 8/2012 | Dake et al. |
| 2013/0013569 A1 | 1/2013 | Pafumi et al. |
| 2013/0024718 A1 | 1/2013 | Mewhinney et al. |
| 2013/0031341 A1 | 1/2013 | Ganti et al. |

OTHER PUBLICATIONS

Harris et al., "Logical Partitions on System i5 A Guide to Planning and Configuring LPAR with HMC on System i", <ibm.com/redbooks>, Second Edition (May 2006), International Technical Support Organization, © Copyright International Business Machines Corporation 2005, 2006.

"Blade server", Wikipedia, the free encyclopedia, As of May 31, 2013, page last modified on Mar. 17, 2013 at 17:41, <http://en.wikipedia.org/wiki/Blade_server>.

"Quick Failover of Blade Servers", ip.com, An IP.com Prior Art Database Technical Disclosure, IP.com No. IPCOM000225111D, IP.com Electronic Publication: Jan. 24, 2013, pp. 1-4.

U.S. Appl. No. 13/930,291, entitled "Quick Failover of Blade Server", filed Jun. 28, 2013.

* cited by examiner

QUICK FAILOVER OF BLADE SERVER

CROSS-REFERENCE TO RELATED APPLICATIONS

This application claims priority to co-pending application Ser. No. 13/930,291, filed Jun. 28, 2013.

FIELD OF THE INVENTION

The present invention relates generally to the field of blade servers, and more particularly to failover of blade servers.

BACKGROUND OF THE INVENTION

In common parlance, a blade server is a stripped-down server computer having a modular design optimized to minimize the use of physical space and energy. Blade servers typically are lacking many components to save space, minimize power consumption and provide for other considerations, while still having all the functional components to be considered a computer. However, in this application, "blade server" shall be specially defined to mean as follows: any computer (see DEFINITIONS section) that is or can be used to do the work typically performed by a blade server, without regard to components that it may or may not lack relative to other computers. "Proper blade server" shall be herein defined to mean: any computer that is considered as a blade server under currently conventional definitions or understandings of the term "blade server."

In a data center, the blade servers are characterized by machine type, network addresses and storage addresses which are virtual addresses. In case of a blade server (sometimes herein simply referred to as a "server") failure, another blade server is picked up from the spare pool of standby servers, to replace the failing server. In existing solutions for the fail over: (i) the failing server is powered off; (ii) the addresses (network and storage) of the failing blade server are applied to the new replacing server; (iii) the replacing server is switched on to the power ON mode; (iv) the replacing server is booted to an operating system (OS); (v) the replacing server takes over the failing server workload. Typically, this process consumes from 5 to 7 minutes. During this time interval, the services offered by the failing blade server are unavailable. In conventional blade server operations, the spare pool servers are in stand by mode. They are booted to an OS only when they are chosen for the replacement and the address of the failing server is applied to one of them as part of the replacement process described above. In conventional systems the firmware that initializes, probes and configures the appropriate input/output (I/O) cards will only run during the process of booting.

SUMMARY

A process, system and/or computer program product for performing, at least a portion of, a failover from a failing blade server to a replacing blade server. The method include the following steps: (i) booting a replacing blade server to a set of operating system(s) including a first operating system; (ii) receiving, by the replacing blade server, command data while the replacing blade server in a booted state; and (iii) responsive to the command data, configuring the replacing blade server to replace the failing blade server without any rebooting of the replacing blade server.

DETAILED DESCRIPTION

Figure 1A:
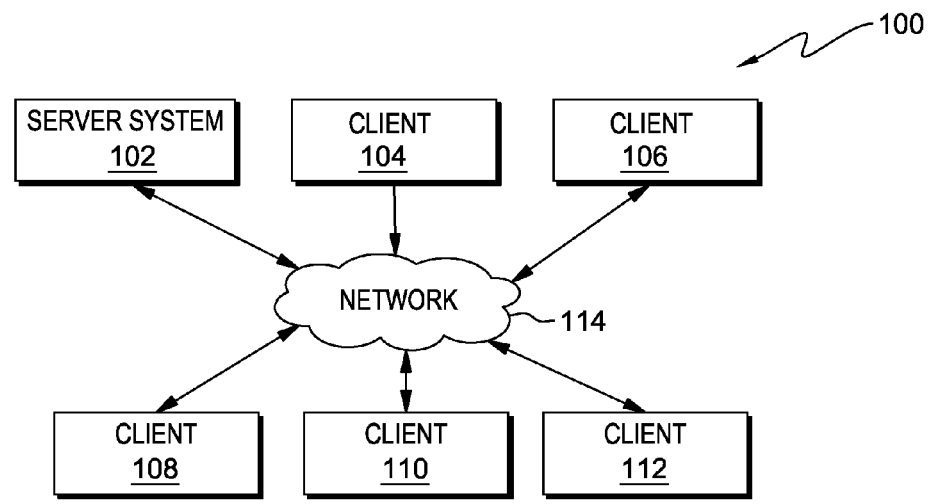
FIG. 1A is a schematic view of a first embodiment of a computer system (that is, a system including one or more processing devices) according to the present invention.

This Detailed Description section is divided into the following sub-sections: (i) The Hardware and Software Environment; (ii) Operation of Embodiment(s) of the Present Invention; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1B:
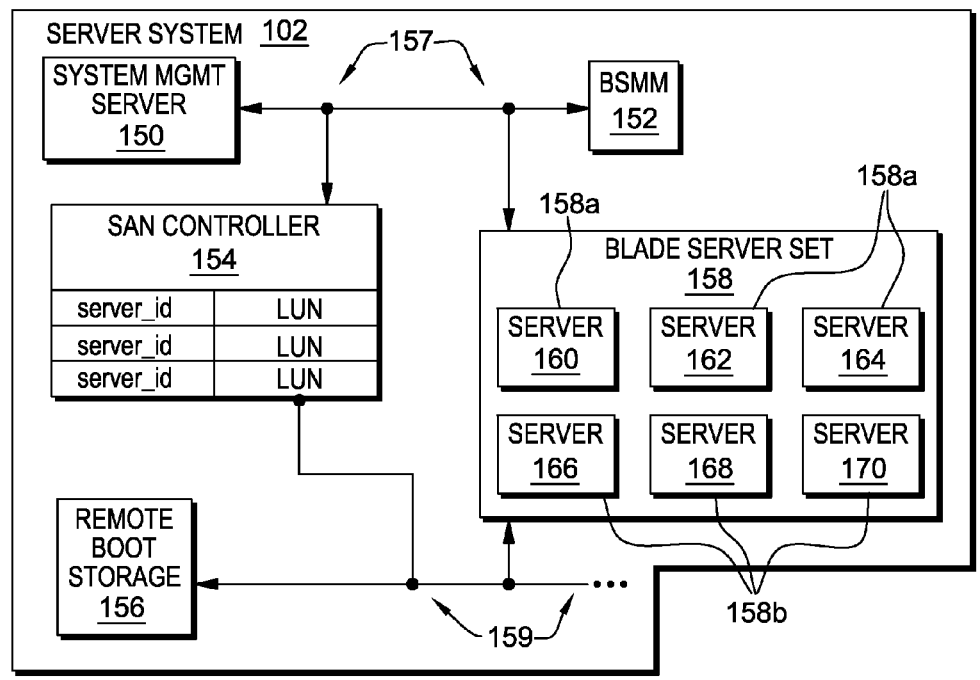
FIG. 1B is a schematic view of a server system which is a constituent part of the larger first embodiment computer system.
Figure 2:
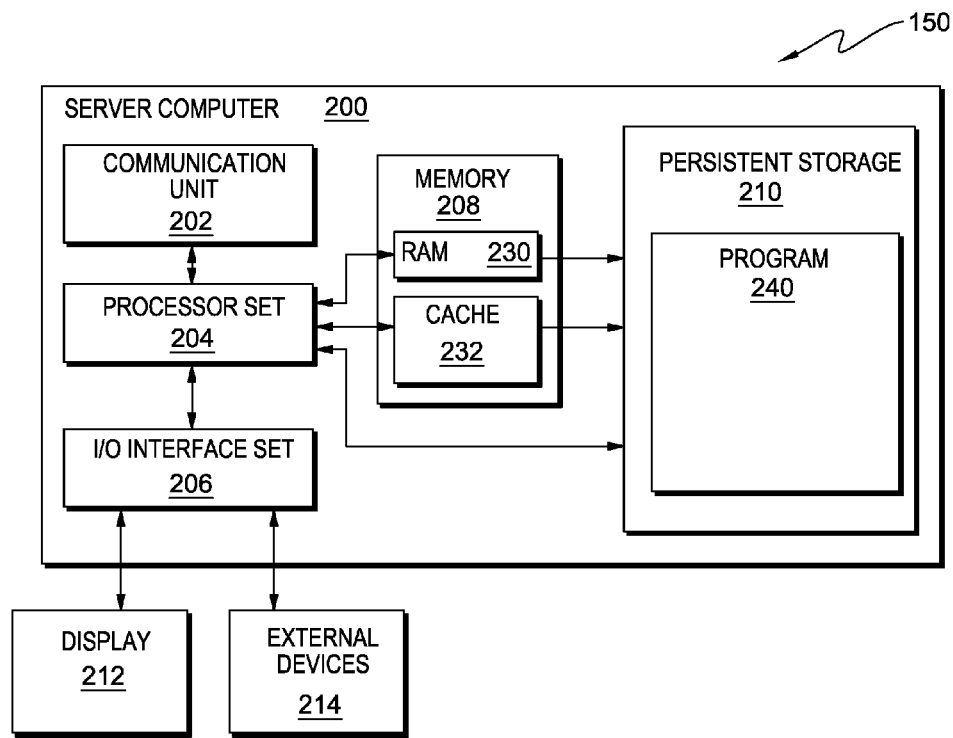
FIG. 2 is a schematic view of a system management computer sub-system which is a constituent part of the server system of FIG. 1B.

An embodiment of a possible hardware and software environment for software and/or methods according to the present invention will now be described in detail with reference to the Figures. FIGS. 1A, 1B and 2 collectively make up a functional block diagram illustrating various portions of distributed data processing system 100, including: server system 102; client computer sub-systems 104, 106, 108, 110, 112; communication network 114; system management server sub-system 150; storage area network (SAN) controller 154; remote boot storage device 156; blade system management module (BSMM) 152; blade server set 158 (including active (or failing) blade server sub-set 158a and pool (or replacing) blade server sub-set 158b); blade server sub-systems (sometimes simply called, blades, servers or blade servers) 160, 162, 164, 166, 168, 170; SAN 159; local area network (LAN) 157; server computer 200; communication unit 202; processor set 204; input/output (i/o) unit 206; memory device 208; persistent storage device 210; display device 212; external device set 214; random access memory (RAM) devices 230; cache memory device 232; and program 240.

SAN controller 154: (i) is a kind of virtualization and management appliance for attached storage; and (ii) manages certain functions including LUN zoning. LUN zoning is a method of configuring storage area network (SAN) fabric to match logical unit numbers (LUNs) so that end device access is limited to the appropriate storage devices. In this context, storage devices are conventionally treated as logical units. To explain further, LUN zoning is a method of configuration where certain servers with an identification number will be assigned or authenticated to a certain LUN. In this embodiment, there are two types of LUN zonings: (i) hard zoning where the zoning is configured between per target and per initiator level with port connections using fibre channel switch; and (ii) soft zoning done by using WWN (World Wide Node) numbers. System 100 addresses "pain points" in soft zoning, so that the SAN administrator need not change the WWN in the configuration when he replaces a failed fibre channel device.

Remote boot storage device 156 represents the remote boot storage that SAN controller 154 manages. In this embodiment, device 156 includes a group of disk storage arrays with LUN numbers assigned for identification. All these storage devices are connected among them as a SAN using a fibre channel network.

BSMM 152: (i) manages and monitors all the servers in blade server set 158; and (ii) is normally outside the system management server computer (but it can be inside as well). System management server sub-system 150 can manage any number of blade server sets along with storage and network, as well. BSMM 152 manages its own blade server set and, in this embodiment, sits at the backside of blade server set enclosure. System management server sub-system 150 manages the blade servers that are in blade server set through BSMM 152. In embodiments where the BSMM is inside the system management server, the functionality of sub-system 150 might be limited to only management of one server set.

As shown in FIG. 2, system management server sub-system 150 is, in many respects, representative of the various computer sub-system(s) in the present invention. Accordingly, several portions of sub-system 150 will now be discussed in the following paragraphs.

Server computer 200 may be a laptop computer, tablet computer, netbook computer, personal computer (PC), a desktop computer, a personal digital assistant (PDA), a smart phone, or any programmable electronic device capable of communicating with the client sub-systems via network 114. Program 240 is a collection of machine readable instructions and/or data that is used to create, manage and control certain software functions that will be discussed in detail, below, in the Operation of the Embodiment(s) sub-section of this Detailed Description section.

System management server sub-system 150 is capable of communicating with other computer sub-systems via network 114 (see FIG. 1). Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIGS. 1A, 1B, and 2, taken together, provide only an illustration of one implementation (that is, system 100) and do not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 2, sub-system 150 is shown as a block diagram with many double arrows. These double arrows (no separate reference numerals) represent a communications fabric, which provides communications between various components of sub-system 150. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 150; and/or (ii) devices external to sub-system 150 may be able to provide memory for sub-system 150.

Program 240 is stored in persistent storage 210 for access and/or execution by one or more of the respective computer processors 204, usually through one or more memories of memory 208. Persistent storage 210: (i) is at least more persistent than a signal in transit; (ii) stores the device on a tangible medium (such as magnetic or optical domains); and (iii) is substantially less persistent than permanent storage. Alternatively, data storage may be more persistent and/or permanent than the type of storage provided by persistent storage 210.

Program 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 150, such as client sub-systems 104, 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface(s) 206 allows for input and output of data with other devices that may be connected locally in data communication with server computer 200. For example, I/O interface 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Operation of Embodiment(s) of the Present Invention

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
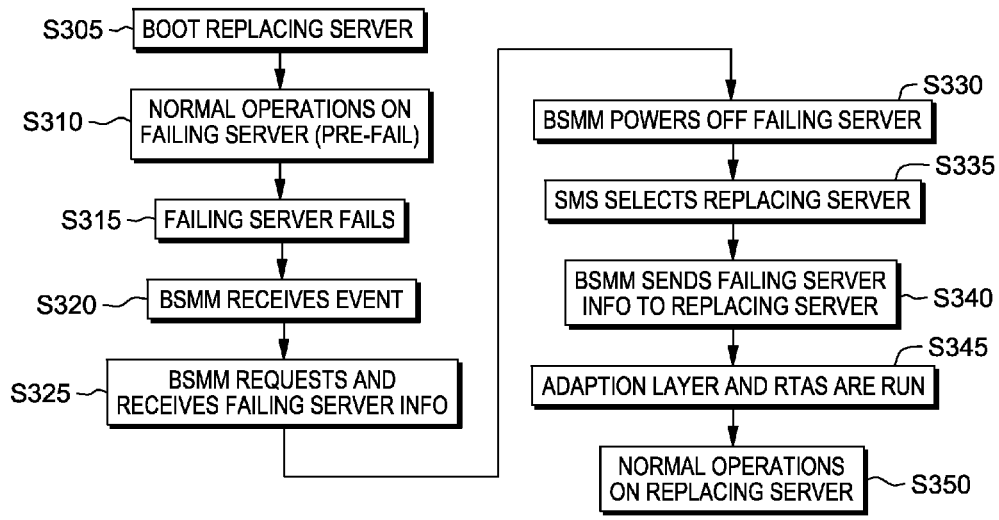
FIG. 3 is a flowchart showing a process performed, at least in part, by the first embodiment computer system.

As shown in FIG. 3, processing begins at step S305, where BSMM 152 (see FIG. 1B) commands pool blade servers 166, 168, 170 to boot to their respective operating systems (OSs). This is unlike many, if not all conventional systems, where pool servers are not booted until after a particular pool server has been selected to be a replacing blade server for a failing blade server. However, in this embodiment, at the time of step S305, none of the blade servers 166, 168, 170 has yet been selected as a replacing blade server (although they may sometimes be referred to as "replacing blade servers" because all of these pool blade servers are eligible to be selected as replacing blade servers). As will be further explained below, this early booting of the pool blade servers has important consequences with respect to how process 300 operates.

As shown in FIG. 3, processing proceeds to step S310 where active blade servers 160, 162, 164 (see FIG. 1B) perform normal blade server operations. Those of skill in the art will understand how blade server sets work and what they do, so no extended discussion on this point is needed, but it is noted that the active blade servers provide data through network 114 to the various client sub-systems 104, 106, 108, 110, 112 (see FIG. 1A). Although, at the time of step S310, none of the blade servers has yet failed, one of them will during the course of process 300 (which would, in a real server system be repeated multiple times for multiple failovers that occur at unpredictable times). Because the active servers are subject to failure, they are sometimes referred to herein as failing servers. At step S310, the server which is destined to fail is in its pre-fail, normal operations stage and is therefore operating as a conventional blade server does.

In this embodiment, during the normal operations of the server that is destined to fail, BSMM 152 (see FIG. 1B) checks, and periodically re-checks, the health of the pool servers. More specifically, BSMM does this check and reports it to system management server sub-system 150, and the system management server sub-set collects all the data from multiple blade server sets. This embodiment of the present invention allows this health check because the pool blade servers are (unlike prior art blade servers): (i) powered on when they are merely waiting in the pool; and (ii) booted to their respective OS(s) when they are merely waiting in the pool. In this way, when the time comes to select a pool blade server as a replacing blade server, there will be good assurance that the selected pool blade server is in good health, so that further failovers will not be required. Also, if the pool does not have enough healthy servers to reliably handle "anticipated failover workload," then this problem can be addressed early because the bad health of the pool blade servers will be known relatively early. For example, the anticipated failover workload is the failover workload anticipated in a worst-case scenario such as when all of the active blade servers fail at the same time.

In this embodiment, during the normal operations of the server that is destined to fail, BSMM 152 (see FIG. 1B) checks the computing resources of the pool servers. This embodiment of the present invention allows this computing resources (for example, processing resources, data storage resources, memory resources, etc.) check because the pool blade servers are (unlike prior art blade servers): (i) powered on when they are merely waiting in the pool; and (ii) booted to their respective OS(s) when they are merely waiting in the pool. In this way, when the time comes to select a pool blade server as a replacing blade server, there will be good assurance that: (i) the selected pool blade server has sufficient computing resources to handle the work of the failing server; and (ii) that the selected pool blade server does not have an unduly excessive amount of computing resources for the work of the failing blade server. Also, if the pool does not have enough computing resources to reliably handle anticipated failover workload, then this problem can be addressed early because the available computing resources of the pool blade servers will be known relatively early.

As shown in FIG. 3, processing proceeds to step S315 where server 160 (see FIG. 1B) fails. As part of the failing, server 160 outputs a signal that is called an "event," as is currently conventional. Processing proceeds to step S320 where BSMM 152 receives the even signal from the failing server.

As shown in FIG. 3, processing proceeds to step S325 where BSMM 152 requests and receives "failing server information" from failing server 160. In this embodiment, the failing server information includes network address, storage address and machine type. BSMM 152 will use this information in subsequent steps as the failing server is replaced by a replacing server. Alternatively, BSMM may be provided with this information long prior to the failure of step S315, thereby making step S325 unnecessary.

As shown in FIG. 3, processing proceeds to step S330 where BSMM 152 commands failing server 160 (see FIG. 1B) to power off.

As shown in FIG. 3, processing proceeds to step S335 where system management server sub-system selects which of the pool servers 166, 168, 170 will replace failing server. System management server sub-system 150 determines which server will be the replacing server. Whenever sub-system 150 gets the alarm, that one of its constituent blades went offline, sub-system 150: (i) checks its collected data of all pool servers from different blade server sets; (ii) assigns an appropriate replacing server; and (iii) sends the new address to the BSMM where the replacing server resides. In response, the recipient BSMM applies the new IDs. In this example, an example where server 166 is the replacing server will be discussed, and also, a variation where server 168 is the replacing server will be discussed. As mentioned above, in this embodiment, this selection is based, in part, upon the following factors: (i) pool blade server health (that is, avoidance of selection of unhealthy pool blade servers); and (ii) pool blade server computing resources (that is, selected replacing blade server should preferably be "matched" as well as feasible to the pre-fail work that the failing server was performing).

Processing proceeds to step S340 where BSMM 152 (see FIG. 1B) sends the failing server information, from step S325, to replacing server 166 (see FIG. 1B), along with a command that replacing server 166 should leave the pool and replace the failing server by taking over its work. In this embodiment, the information and commands sent to the replacing server at this point is similar to what is sent to a replacing server in a conventional system in substance, form, format, ordering and protocol. However, in conventional systems this information is sent to the service processor of server blade in standby state, while, in this embodiment, this information is applied while the server is up and running the OS.

Processing proceeds to step S345 where the replacing blade server (166 in the main example of this embodiment, but 168 in a variation) runs run-time abstraction software services (RTAS services) and the adaption layer software. More specifically, the adaption layer seeks the services of RTAS to allow the failing server to take over from the replacing server when the replacing server has already booted to an OS. The adaption layer is a separate software component, which interprets the new ID and respective port details from data, and writes the new IDs on the appropriate cards. RTAS helps in the performance of de-configuring and re-configuring, respectively, before and after the write operation. The running of the RTAS services uses the failing server information to allow the replacing blade server 166, 168 to take the place of the failing blade server. In this embodiment, the RTAS services appropriately configure the replacing blade server without rebooting it. This means that there is no delay in the failover that would otherwise occur as a consequence of the fact that the replacing blade server must boot or re-boot. Alternatively, there may be other types of software (besides abstraction software layer and RTAS) that allow a replacing server to accept a failover even after it has booted. This kind of software will collectively herein be termed as "post-boot failover software." Post-boot failover software must be able to do at least the following: (i) perform all ID-related actions associated with failover; (ii) perform all port-related actions associated with failover; (iii) perform all deconfiguration and/or reconfiguration actions associated with failover; and (iv) perform all of the foregoing actions (i) to (iii) after the replacing server has been booted (and without re-booting).

As shown in FIG. 3, processing proceeds to step S350 where replacing server 166 or 168 fully replaces failing blade server 160. The failover is complete.

Figure 4:
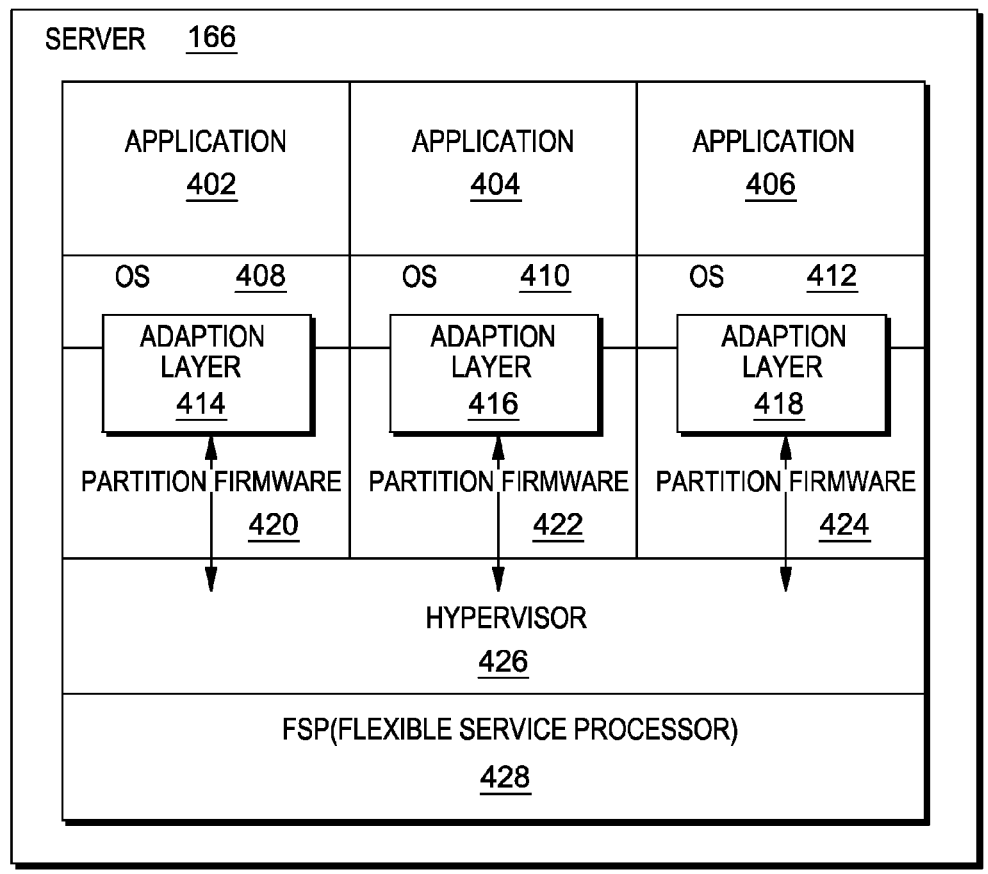
FIG. 4 is a schematic view of a blade server computer in the server system of FIG. 1B.

The adaption layers of blade server 166 will now be discussed with reference to FIG. 4, which shows blade server 166 including: applications 402, 404, 406; OSs 408, 410, 412; adaption layers 414, 416, 418; partition firmware modules (mods) 420, 422, 424; hypervisor 426; and flexible service processor 428. The double arrows indicate communications between the adaption layers 414, 416 and 418 and hypervisor 426 as server 166 runs the RTAS services at step S345. In this example, each application has its own dedicated OS, adaption layer and partition firmware mod. Because the OS is booted prior to receiving the command to run the RTAS services and configure for failover, the adaption layer is ready and able to run the RTAS services without any delay.

Figure 5:
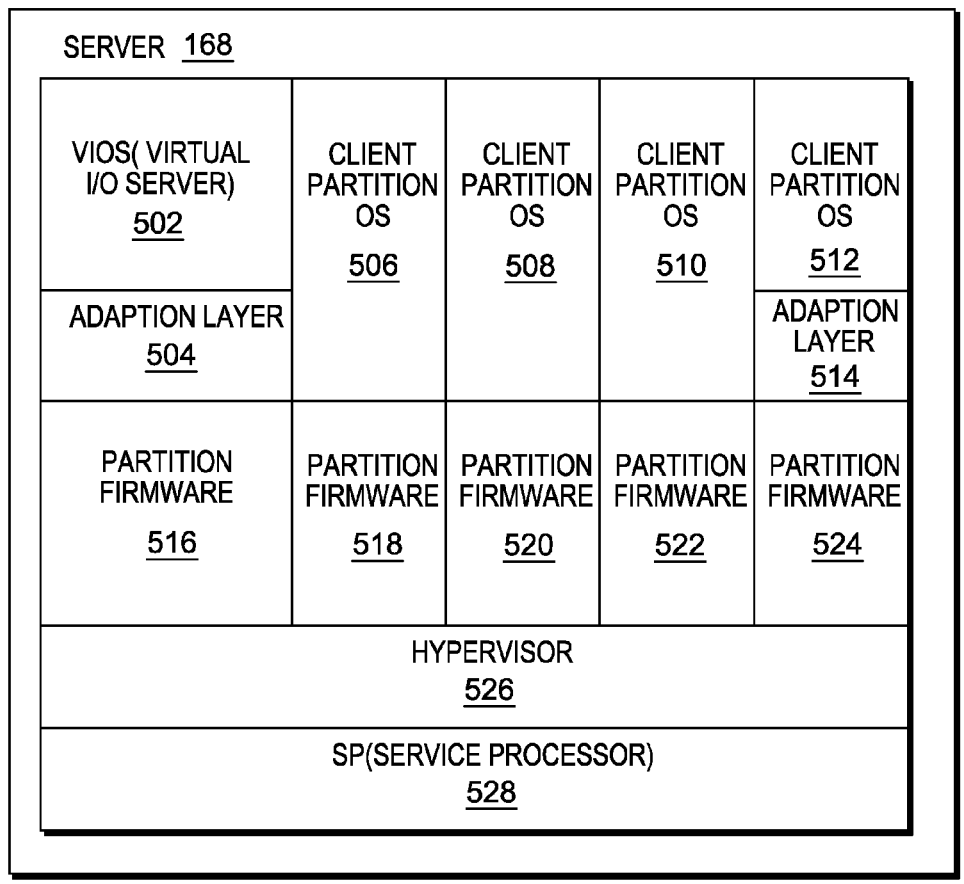
FIG. 5 is a schematic view of another blade server computer in the server system of FIG. 1B.

The adaption layers of blade server 168 will now be discussed with reference to FIG. 5, which shows blade server 168 including: adaption layer 504; virtual input/output server (VIOS) 502; client partition OSs 506, 508, 510, 512; adaption layer (one physical adaptor) 514; partition firmware mods 516, 518, 520, 522, 524; hypervisor 526; and service processor 528. In this variation, only two of the client partition OSs type blocks have adaption layers that run the RTAS services at step S345, specifically VIOS 502 and client partition OS 512. The VIOS virtually shares multiple physical adaptors among client partitions. Adaption layer 514, of client partition OS 512, has one physical adaptor.

III. Further Comments and/or Embodiments

The present disclosure recognizes that: (i) the health of the server can not be known until the replacing server is booted to its OS; (ii) in cases where the health of the chosen replacing spare pool sever is not good there will be a second failover to yet another prospective replacing server; (iii) when in standby mode the resource capacity of a prospective replacing server in the pool is not known, which can cause a resource mismatch between the failing server and the chosen replacing pool server; and (iv) the potential resource mismatch noted in the previous item has unfavorable results (for example, the load is not able to run on the replacing server, the load runs with a degraded performance, etc.).

Some embodiments of the present invention may have, in the event of a failover, one or more of the following characteristics, features and/or advantages: (i) a provision to apply blade server related addresses on a replacing server which is already booted (for example, booted in logical partition mode); (ii) customer does not need to bring down all the partitions and reboot the whole system in full-system mode; (iii) customer does not need to apply the failed blade server's addresses before re-configuring the whole replacing server machine into logical partition mode; (iv) faster resumption of normal operations after failover; (v) reduction in required computing resources; (vi) reduction in amount of down time for all the applications running on partitions of failed server; and/or (vii) provision for servers managed by integrated virtual manager (IVM) with VIOS (Virtual I/O Server) (for example, configurations where the I/O adapters are shared among the VIOS client partitions).

In some embodiments of the present invention, the servers in the spare pool are booted to OS mode and ready to execute the workload of a failing server. Because these embodiments do not require booting to OS, it is generally a faster process and generally consumes a few seconds instead of 5-7 minutes (as is currently conventional) to recover the failed services. Some embodiments of the present disclosure avoid multiple (or cascading) failovers by: (i) avoiding resource mismatches between the failing server and the replacing server; and/or (ii) taking measure(s) to ensure good health of the replacing server before the replacing server is chosen to be a replacing server. This is because the spare pool servers are already booted to OS, making it easy to get the capability and status before picking up the replacing server.

In some embodiments of the present invention, the property (network and storage address settings (sometimes herein collectively referred to as server-related addresses)) of the failed server can be applied without rebooting the replacing servers by running the services in an adaption layer that is underneath the layer of the OS. In some embodiments of the present disclosure, in the LPAR (Logical Partition) environment, network properties are pushed to the I/O adapters on a partition basis without shutting down even a single partition. This avoids a lot of downtime on all the applications running on scores of partitions. Using the proposed solution one can apply the network properties of the failed blade on to the replaced blade which is already booted in logical partition mode, before migrating the work load from failed blade partition to replaced blade partition. In an LPAR environment, each partition has its own OS and will therefore generally have its own adaption layer as well. In some embodiments of the present disclosure, a partition's own adaption layer will perform the operation of writing new network properties with the help of a hypervisor.

In some embodiments of the present invention, in a virtual I/O server environment, VIOS owns all the I/O resources and provides I/O bandwidth to all other client partitions. In the VIOS environment, as all the I/O resources are owned by VIOS (Virtual I/O Server), the adaption layer will apply the new IDs to the adapters on VIOS itself. A given adaption layer, running along with a VIOS image, performs the job of writing the new network properties (for example, MAC/WWNN/WWPN (Media Access Control/World Wide Node Number/World Wide Port number)) to I/O adapters. In some embodiments of the present disclosure, an adaption layer gets instantiated along with the OS on client partitions only in the event that the partition owns physical adapter(s). If the client partition merely shares the virtual adapters, not owning any physical I/Os, then the client generally will not have an adaption layer running. Accordingly, VIOS client partitions that are purely virtual will not be required to run any adaption layer services.

In some embodiments of the present invention, the following process occurs: (i) a blade server fails in the data center; (ii) the failing blade server sends an event to the system management server; (iii) the system management server switches off the failing blade server; (iv) the system management server requests a blade system management module to capture certain characteristics of the failing server, such as network address and storage address; (v) the system management server picks up one of the servers (herein called the "replacing server") from the spare pool server set; (vi) the system management server applies the captured characteristics of the failing server to the replacing server; (vii) an adaption layer of the replacing server (running as the runtime services underneath the OS) performs the services required for configuring the replacing server with the captured characteristics (for example, network address and storage address) of the failing server; and (viii) the replacing server thereby fully and effectively replaces the failing server to maintain and/or restore all services of the failing server.

Some embodiments of the present invention have one or more of the following features and/or characteristics: (i) new use of a BOFM (blade open fabric manager) tool; and (ii) runtime services, running on the replacing server, as the adaptation layer.

According to some embodiments of the present invention, there is a process for updating a Media Access Control (MAC) address and World Wide Port Number/World Wide Node Number (WWPN/WWNN) as follows: (i) a BOFM tool pushes the new MAC, WWPN/WWNN addresses to the OS of the replacing server (instead of to its service processor); (ii) the replacing server's OS detects the write operation pertaining to the addresses and responsively initiates dynamic reconfiguration functions using an adaption layer; (iii) once the adaptation layer detects the new addresses, it responsively calls the FCODE (that is, a bytecode which is independent of computer architecture details) functions on the card to write the new addresses into card's NVRAM (non-volatile random-access memory) region; (iv) the adaptation layer of the replacing server updates all the device properties as per the new addresses, so that the OS of the replacing server will have an updated copy of all the MAC and WWPN/WWNN addresses; and (v) the adaption layer of the replacing server also provides services for support in the LPAR environment.

In some embodiments of the present invention, in the LPAR environment, partitions only maintain relative port numbers. The adaptation layer picks up the physical port numbers for those relative port numbers from a hypervisor that maintains the mapping tables in the partition environment. Once the adaption layer determines the physical port numbers, the adaptation layer picks up the corresponding new IDs (for example, the new MAC and WWPN/WWNN addresses) from the BOFM data segment and calls the FCODE functions to configure the new IDs on respective ports of the replacing server. In these embodiments of the present invention, in the LPAR environment, the partition only maintains relative port numbers. In some embodiments of the present invention, the adaption layer reads the physical port number for the relative port from the hypervisor and applies network properties on them.

In some embodiments of the present invention, VIOS owns all the I/O resources and provides I/O bandwidth to all other client partitions. In a VIOS environment, as all the I/O resources are owned by a VIOS, the adaption layer will apply the new IDs to the adapters on VIOS itself.

In some embodiments of the present invention, a BOFM tool pushes the new data pertaining to the whole blade to all the partitions. But the partition(s) that own the corresponding physical adapter(s) apply the corresponding new ID for their respectively owned I/O port(s), after getting the services from the hypervisor driver needed to identify the ID to be applied.

In some embodiments of the present invention, in a VIOS environment, the client partitions are purely virtual and do not own any single physical adapter. In these embodiments the client partitions will not instantiate the adaption layer while OS boots, because the adaption layer is not required as the partition doesn't own any physical adapters to which to apply the new IDs. As the I/O adapter is shared by multiple partitions, all the partitions which are sharing a particular adapter, will receive the new IDs.

Now a method according to the present invention will be discussed, where the method handles the case where the OS itself resides on the SAN (storage area network) disk of the storage adapter that is being changed during failover. If the blades are running the OS from a storage area network disk, then it is generally not feasible to change the ID without bringing down the OS. As the relevant port is solely used for the OS, this method declares the port as a privileged port, thereby shielding it from any new ID application. The adaption layer picks up the port details from the partition firmware using the client interface. This is facilitated by the fact that the adaption layer has close ties with the partition firmware. Application of the new ID on privileged port will fail and therefore gets reported back to user with a special return code.

In some embodiments of the present disclosure, the replacing blade server will not be running any workload prior to failover, which means that there will not be a problem with devices becoming stale.

In some embodiments of the present invention, the change of IDs happens according to the following process: (i) identify the ports against which new IDs have been written in incoming BOFM file; (ii) first the driver for the adapter gets removed; (iii) if none of the ports on a given adapter have new IDs, then that adapter will be untouched, saving some system time; (iv) run time abstraction services perform the dynamic slot remove operation on the adapter; (v) using an open firmware client interface, the adaption layer calls the BOFM FCODE methods for the adapter for writing new IDs; (vi) adapter ROM (read only memory) has two areas where the MAC address gets stored (that is, one area is for temporary storage and one is for permanent storage (for example, the manufactured MAC is stored in the permanent area); (vii) using the custom Fcode write calls, the adaption layer writes the new MAC value in the NVRAM; (viii) after writing the new MAC, the adaption layer kicks off the partition firmware, which updates the device tree; (ix) once the new device gets added to device tree list, it informs OS, so that it will run the configuration manager on new devices.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: non-exclusive or; for example, A and/or B means that: (i) A is true and B is false; or (ii) A is false and B is true; or (iii) A and B are both true.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A process for performing, at least a portion of, a failover from a failing blade server to a replacing blade server, the method comprising:
  booting a replacing blade server to a set of operating system(s) including a first operating system;
  receiving, by the replacing blade server, command data while the replacing blade server in a booted state; and
  responsive to the command data, configuring the replacing blade server to replace the failing blade server without any rebooting of the replacing blade server; and wherein:
  the configuration is performed by machine logic located in an adaptation layer of the replacing blade server.

2. The process of claim 1 wherein:
  the command data further includes failing server data to be used in configuration of the replacing blade server as a replacement for the failing blade server; and
  the command data includes at least one of the following: a media access control address associated with the failing blade server, a worldwide port number associated with the failing blade server and/or a worldwide network node number associated with the failing server.

* * * * *